United States Patent [19]

Markum

[11] 4,167,153
[45] Sep. 11, 1979

[54] METHOD AND APPARATUS FOR IMPROVING POULTRY FEED CONVERSION

[76] Inventor: Donnie D. Markum, 407 N. E St., Duncan, Okla. 73533

[21] Appl. No.: 757,938

[22] Filed: Jan. 10, 1977

[51] Int. Cl.² ............................................. A01K 39/00
[52] U.S. Cl. .................................................. 119/51 R
[58] Field of Search ................... 119/21, 22, 29, 51 R, 119/82

[56] References Cited

U.S. PATENT DOCUMENTS

| 3,124,104 | 3/1964 | Carpenter | 119/22 X |
| 3,805,741 | 4/1974 | Thompson et al. | 119/20 |
| 4,006,714 | 2/1977 | Goossen | 119/20 |

Primary Examiner—Louis G. Mancene
Assistant Examiner—Robert P. Swiatek
Attorney, Agent, or Firm—Laney, Dougherty, Hessin & Beavers

[57] ABSTRACT

A method and apparatus for improving the feed conversion of poultry confined within a poultry raising house. A guide rail having a moveable carriage attached thereto is provided within the house and a baffle positioned adjacent the floor of the house is attached to the carriage. The carriage is periodically caused to move along the guide rail whereby the baffle is moved over substantially the entire floor area of the house so that poultry within the house are disturbed and forced to move to a feeding location.

3 Claims, 3 Drawing Figures

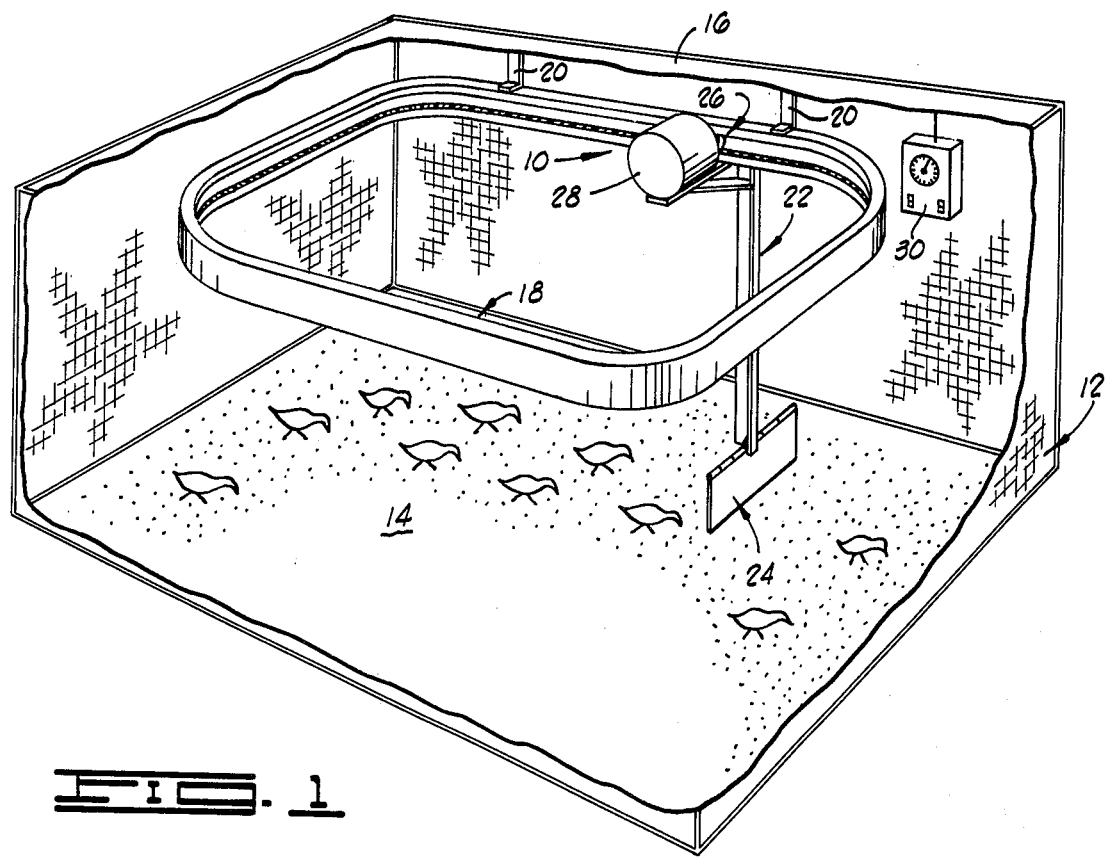
FIG. 1
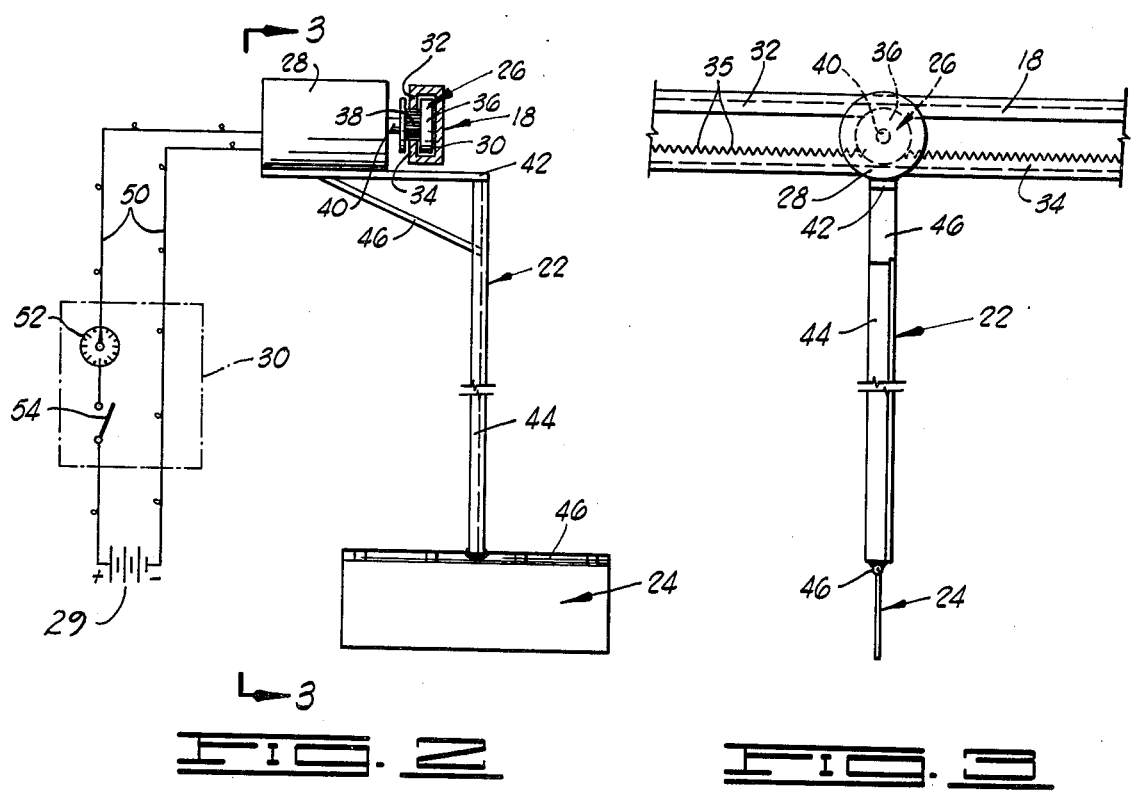
FIG. 2
FIG. 3

METHOD AND APPARATUS FOR IMPROVING POULTRY FEED CONVERSION

BACKGROUND OF THE INVENTION

1. Field of the Invention

The present invention relates to a method and apparatus for improving poultry feed conversion, and more particularly, but not by way of limitation, to a method and apparatus for periodically causing poultry confined within a poultry raising house to move to a feeding location.

2. Description of the Prior Art

Various poultry raising houses and other apparatus for the confined raising of poultry have heretofore been developed. In addition, apparatus for automatically feeding, watering and cleaning such poultry raising houses have been developed and used successfully. However, the frequency at which poultry feed in confined poultry raising houses has generally been uncontrolled. That is, the poultry eat feed supplied within the raising house at a rate dictated by nature only, and the feed conversion by the poultry, i.e., the units of weight gained per weight unit of feed supplied has also been dictated by nature.

The present invention is based on the discovery that poultry confined within a raising house feed for a period of time and then rest or otherwise remain dormant until motivated by hunger to feed again. If the poultry are periodically disturbed and caused to move about, the time intervals between feeding are reduced which in turn improves the feed conversion of the poultry and reduces the raising time required for the poultry to reach a marketable weight.

SUMMARY OF THE INVENTION

By the present invention apparatus is provided for improving the feed conversion of poultry confined within a poultry raising house comprised of a guide rail adapted to be installed within the house, a carriage moveably attached to the guide rail, a baffle attached to the carriage and positioned adjacent the floor of the house, and means attached to the carriage for periodically moving the carriage on the guide rail whereby the baffle is moved along the floor of the house. Methods of improving the feed conversion of poultry confined within a poultry raising house are also provided.

It is, therefore, a general object of the present invention to provide a method and apparatus for improving poultry feed conversion.

A further object of the present invention is the provision of a method for periodically disturbing poultry within a poultry raising house whereby the poultry are caused to feed at an increased rate.

Another object of the present invention is the provision of a simple and economical apparatus adapted to be installed within a poultry raising house which automatically and periodically disturbs poultry within the house whereby the poultry are forced to move to a feeding location within the house.

Other and further objects, features and advantages of the invention will be readily apparent from the description of preferred embodiments which follows when taken in conjunction with the accompanying drawings.

BRIEF DESCRIPTION OF THE DRAWINGS

FIG. 1 is a perspective cutaway view of a poultry raising house having the apparatus of the present invention installed therein.

FIG. 2 is a side elevational view of the apparatus of the present invention with the electric current and control means illustrated diagrammatically.

FIG. 3 is a view of the apparatus of FIG. 2 taken along 3—3 thereof.

DESCRIPTION OF PREFERRED EMBODIMENTS

Referring now to the drawings, and particularly to FIG. 1, the apparatus of the present invention is generally designated by the numeral 10, and is illustrated installed within a poultry raising house 12. As will be understood, the poultry raising house 12 can be of a variety of shapes and sizes, but generally includes a floor 14 and a ceiling or roof 16.

The apparatus 10 includes a guide rail 18 which is preferably continuous and adapted to be suspended from the ceiling or roof 16 of the raising house 12 by a plurality of support members 20. A carriage 22 is moveably connected to the guide rail 18, and a baffle 24 is attached to the carriage 22 positioned a short distance above the floor 14 of the raising house 12. Drive wheel means 26, which will be described in greater detail hereinbelow, engage the guide rail 18 in a manner such that rotation of the guide wheel means 26 causes the carriage 22 and baffle 24 to be moved along the guide rail 18. An electric motor 28 for rotating the drive wheel means 26 is attached to the carriage 22 and to the drive wheel means 26, and a control panel 30, which will also be described further hereinbelow, is interconnected between the electric motor 28 and a source of electric power 29.

As will be understood by those skilled in the art, the guide rail 18 and carriage 22 can take a variety of forms and designs. That is, various apparatus and techniques can be utilized for suspending or supporting a carriage on a guide rail and causing the carriage to move along the guide rail. For example, the carriage can be moved on the guide rail by means of a continuous cable or chain connected thereto which is in turn connected to a sprocket or wheel which causes the cable or chain to move. Other arrangements wherein the carriage 22 includes one or more wheels which are supported on and moved over the guide rail can also be utilized. In a presently preferred form of this invention, the carriage 22 is suspended from the guide rail 18 and caused to move along the guide rail by electric motor driven drive wheel means which positively engage the guide rail. As best shown in FIGS. 2 and 3, the guide rail 18 is a three sided rectangular channel 30 having the open side positioned vertically. A continuous downwardly extending lip 32 is attached at the top of the open side of the channel 30, and a continuous upwardly extending serrated lip 34 is attached at the bottom thereof. As shown in FIG. 1, the guide rail 18 is continuous and is positioned in a horizontal plane parallel to the floor 14 of the house 12.

The drive wheel means 26 is comprised of a cylindrical wheel 36 having an annular recess 38 formed therein positioned so that the downwardly and upwardly projecting lips 32 and 34 of the guide rail 18 extend into the recess 38. The enlarged portion of the wheel 36 on one side of the recess 38 lies within the channel 30 and the enlarged portion of the wheel 36 on the other side of the recess 38 lies outside of the channel 30 whereby the wheel 36 is retained in engagement with the guide rail 18. The internal surface of the recess 38 includes teeth which are of a size and spacing such that they engage the serrations 35 on the upwardly projecting lip 34.

The electric motor 28 includes a drive shaft 40 which is concentrically attached to the wheel 36. A section of angle iron 42 is welded or bolted to the electric motor 28 and extends beneath the guide rail 18 to a point on the opposite side thereof from the electric motor 28. A vertically positioned section of angle iron 44 is welded or otherwise attached to the end of the angle iron 42, and a section of angle iron 46 is diagonally connected between the sections 42 and 44 to provide rigidity thereto. As will be understood, the length of the section of angle iron 42 is adjusted so that the carriage 22 is balanced, and the section of angle iron 42 and the electric motor 28 are maintained in a horizontal position with the angle iron 44 in a vertical position.

The baffle 24 is preferably rectangular in shape and is positioned in a vertical plane transverse to the longitudinal axis of the guide rail 18. The upper end of the baffle 24 is connected to the bottom end of the section of angle iron 44 by a hinge 46 which allows the baffle 24 to swing about a horizontal axis.

The electric motor 28 is connected by appropriate electric wires 50 to the control panel 30 which is in turn connected to a source of electric power such as a battery or an outlet for commercially generated 110 volt electricity. The control components utilized in the control panel 30 are conventional and function to start and stop the electric motor 28 on a timed sequential basis. Generally, the control panel 30 includes a timer 52 which operates in conjunction with one or more switch closures to start and stop the electric motor 28 in a desired sequence, and an on-off switch 54. In a preferred form of the invention, an electric switch component (not shown) is provided either in the control panel 30 or on the electric motor 28 for changing the direction of rotation of the shaft 40 and the drive wheel means 26 each time the electric motor 28 is activated.

In operation of the apparatus 10, the timer 52 is set so that the electric motor 28 is activated at desired timed intervals causing the carriage 22 and baffle 24 to move along the guide rail 18 at a relatively slow speed. Preferably, the timer is set or controls are otherwise provided on the electric motor 28 and guide rail 18 such that each time the electric motor 28 is started it continues to run until the carriage 22 makes one complete circuit around the guide rail 18. As indicated above, it is also preferable that the direction of movement of the carriage 22 on the guide rail 18 change each time the electric motor 28 is activated.

The size of the guide rail 18 and the width of the baffle 24 are such that as the carriage 22 moves around the guide rail 18, the baffle 24 is moved over substantially the entire floor area of the house 12. As will now be apparent, the movement of the baffle 24 over the floor 14 disturbs the poultry on the floor 14 causing them to move about and to eat feed provided either on the floor 14 or at a feeding location adjacent to the floor 14. As mentioned above, disturbing the poultry on a periodic basis causes the poultry to eat more often and thereby improve the feed conversion of the poultry as well as shortening the time period required to raise the poultry to marketable weight.

The baffle 24 is hinged to the section of angle iron 44 so that if one or more of the poultry are unable to move away from the baffle as it is moved over the floor 14, the baffle will swing upwardly and the poultry will not be injured. As will be understood, the baffle 24 can be of any of a variety of shapes which will have the effect of causing the poultry within the house 12 to move about as the baffle moves around the floor area thereof. As the poultry become used to a particular shape of baffle whereby they do not move out of the way of the baffle, an alternate shape of baffle can be used. For example, the baffle 24 can be larger or smaller than the embodiment shown in the drawings and can take the general shape of a man or animal.

The particular time interval between activating the electric motor 28 and causing the carriage 22 and baffle 24 to be moved around the floor 14 of the house 12 depends on a variety of factors such as the number of poultry confined within the house 12, the type of poultry being raised, the size and weight of the poultry, etc. Generally however, the time interval between movement of the apparatus 10 will range from about 30 minutes to about 90 minutes. As will be further understood, changing the direction of movement of the carriage 22 and baffle 24 along the guide rail 18 each time the electric motor 28 is activated, has the effect of causing the poultry to move more than is the case when the apparatus 10 moves in a single direction.

Thus, the present invention is well adapted to carry out the objects and attain the ends and advantages mentioned as well as those inherent therein. While numerous changes in the arrangement and construction of the various parts of the invention will suggest themselves to those skilled in the art, such changes are within the spirit of this invention as defined by the appended claims.

What is claimed is:

1. A method of improving the feed conversion of poultry confined within a poultry raising house which comprises the steps of:
   maintaining feed and water for said poultry at a feed location within said house;
   periodically moving a baffle along the floor of said house in a manner whereby said poultry therewithin are disturbed and forced to move to said feeding location, said step of periodically moving said baffle including:
   providing a guide rail having a movable carriage attached thereto within said house, said carriage having said baffle connected thereto; and
   periodically causing said carriage to move along said guide rail whereby said baffle is moved over substantially the entire floor area of said house.

2. The method of claim 1 wherein said carriage is moved along said guide rail by an electric motor attached to said carriage and said electric motor is periodically activated by an electric timer means interconnected between said electric motor and an electric power source.

3. The method of claim 1 which is further characterized to include the step of changing the direction of movement of said carriage each time said carriage is caused to move along said guide rail.

* * * * *